(12) United States Patent
Gillham et al.

(10) Patent No.: US 7,002,153 B1
(45) Date of Patent: Feb. 21, 2006

(54) MICRO-BRIDGE STRUCTURE

(75) Inventors: John P Gillham, Malvern (GB); Rex Watton, Malvern (GB); John C Alderman, Cork (IE)

(73) Assignee: Qinetiq Limited, Hants (GB)

( * ) Notice: Subject to any disclaimer, the term of this patent is extended or adjusted under 35 U.S.C. 154(b) by 521 days.

(21) Appl. No.: 10/069,363

(22) PCT Filed: Aug. 23, 2000

(86) PCT No.: PCT/GB00/03243

§ 371 (c)(1),
(2), (4) Date: Feb. 25, 2002

(87) PCT Pub. No.: WO01/14838

PCT Pub. Date: Mar. 1, 2001

(30) Foreign Application Priority Data

Aug. 24, 1999 (GB) .................................. 9919877

(51) Int. Cl.
*G01J 5/20* (2006.01)
(52) U.S. Cl. ................. 250/338.1; 250/332; 250/338.4
(58) Field of Classification Search ............ 250/338.1, 250/338.4, 332, 338.3, 370.01, 349
See application file for complete search history.

(56) References Cited

U.S. PATENT DOCUMENTS

| | | | |
|---|---|---|---|
| 4,544,441 A | 10/1985 | Hartmann et al. | |
| 5,010,251 A | 4/1991 | Grinberg et al. | |
| 5,021,663 A | 6/1991 | Hornbeck | |
| 5,286,976 A | 2/1994 | Cole | |
| 5,288,649 A | 2/1994 | Keenan | |
| 5,300,915 A | 4/1994 | Higashi et al. | |
| 5,367,167 A | 11/1994 | Keenan | |
| 5,397,897 A | 3/1995 | Komatsu et al. | |
| 5,399,897 A | 3/1995 | Cunningham et al. | |
| 5,404,125 A * | 4/1995 | Mori et al. | 338/18 |
| 5,420,419 A | 5/1995 | Wood | |
| 5,446,284 A * | 8/1995 | Butler et al. | 250/332 |
| 5,584,117 A | 12/1996 | Lee et al. | |
| 5,698,852 A | 12/1997 | Tanaka et al. | |
| 5,811,815 A | 9/1998 | Marshall et al. | |
| RE36,136 E | 3/1999 | Higashi et al. | |
| 5,912,464 A | 6/1999 | Vilain et al. | |
| 5,939,971 A | 8/1999 | Yong | |
| 5,942,791 A * | 8/1999 | Shorrocks et al. | 257/522 |
| 6,137,107 A | 10/2000 | Hanson et al. | |
| 6,144,030 A | 11/2000 | Ray et al. | |
| 6,198,098 B1 | 3/2001 | Laou | |

(Continued)

FOREIGN PATENT DOCUMENTS

GB 2 335 077 9/1999

(Continued)

OTHER PUBLICATIONS

Wood, "Low-Cost Infrared Imagers", Scientific Honeyweller, US, Honeywell's Corporate. Minneapolis, 1996, pp. 109-116.

*Primary Examiner*—David Porta
*Assistant Examiner*—Faye Polyzos
(74) *Attorney, Agent, or Firm*—Nixon & Vanderhye P.C.

(57) ABSTRACT

A method of fabricating a micro-bridge device (14, 16) onto a substrate (20). The method includes the steps of: providing a sacrificial material (32) on a surface region of the substrate (20); patternwise etching the sacrificial material (32); providing a sensing material (34) on a surface region of the sacrificial material; providing a support material (36) on a surface region of the sensing material; and removing the sacrificial material (32) leaving support material (36) with the sensing material (34) on its lower surface, substantially free standing above the substrate (20).

21 Claims, 5 Drawing Sheets

U.S. PATENT DOCUMENTS 6,307,194 B1 10/2001 Fitzgibbons et al.
6,392,232 B1 5/2002 Gooch et al.
6,541,772 B1 4/2003 Wood
6,661,010 B1 12/2003 Wood
6,690,014 B1 2/2004 Gooch et al.

FOREIGN PATENT DOCUMENTS

JP 11 044572 A 2/1999

* cited by examiner

MICRO-BRIDGE STRUCTURE

This application is the U.S. national phase of international application PCT/GB00/03243 filed Aug. 23, 2000 which designated the U.S.

This invention relates to a method of making a micro-bridge and a new structure for a micro-bridge, such as may be used in imaging devices to detect incident radiation. The invention arose from the field of thermal imaging, but is not necessarily limited to that field.

Infra-red imaging cameras based on two-dimensional arrays of thermal detectors are attractive due to their near ambient temperature operation. Thermal detectors used for infra-red imaging rely on the temperature change of the sensing material due to absorption of infra-red radiation. A 1° C. temperature change in the scene leads to a temperature change of about 0.001° C. temperature change within the detector and it is therefore important to try and maximise the amount of radiation absorbed.

The sensing material has a temperature dependant property which allows the magnitude of the change in temperature to be detected, amplified and displayed using electronic circuitry. Examples are pyroelectric arrays, which rely on the change in electrical polarisation with temperature which occurs in ferroelectric materials, and resistance micro-bolometer arrays which utilise the change in electrical resistance with temperature which occurs in some materials.

In all types of thermal detector it is advantageous to maximise the rise in temperature of the sensing material due to the absorption of infra-red radiation. The temperature rise is reduced by any thermal conduction mechanism which takes heat from the sensing material. This results in detector designs which maximise the thermal isolation of the sensing material. The requirements for electrical read-out and mechanical rigidity mean that, for most practical detectors, a physical connection is required to the sensing material.

Infra-red (IR) imaging relies on the fact that all objects radiate energy with a peak wavelength depending on their temperature. For ambient temperature objects this peak wavelength is in the Infra-red at about 10 $\mu$m. Hotter objects radiate more intensely. IR imaging typically involves using lenses, which may be of Germanium, to collect and focus this radiation onto an array of sensitive elements placed in the focal plane of the optics. The elements are normally micro-capacitors or micro-resistors (micro-bolometers) whose characteristic parameter (charge or resistance respectively) depends on the temperature. The micro-bolometers are usually formed on silicon substrates using "micro-machining techniques". This involves depositing and litho-graphically patterning an active layer over a sacrificial layer that is finally etched away to leave a free-standing, thermally isolated structure.

Such a structure is shown in FIG. 1 of the accompanying drawings wherein legs 2, 4 support the main body of the element 1 above a substrate (not shown). The legs 2, 4 ensure that mechanical support is provided for the main body but with low thermal conductivity to the substrate.

Each element generates an electric signal proportional to its temperature that, in turn, depends on the intensity of the IR energy absorbed by it or its adjacent layer. The electrical signals must then be read out using a circuit that will both filter and amplify.

Traditionally the quantum devices used to detect IR radiation have required cooling to liquid nitrogen temperatures. The "uncooled" technology described herein operates at room temperatures. Since IR radiation is not obscured by smoke this technology is also useful in fire-fighting applications. There are also applications where it is not necessary to form high-resolution images. The IR sensitive elements can be used for simple "intruder detectors" or fire detectors.

Presently there are two basic forms of the resistance micro-bridge. Firstly, there is the homogeneous bridge type, as shown in section in FIG. 2a of the accompanying drawings. In this type of bolometer the bridge is formed from a material whose properties change as the temperature changes through radiation being absorbed. The change in material properties is determined in some manner, perhaps by measuring a change in current passing through the bridge. The skilled person will appreciate that whilst the homogeneous bridge can work satisfactorily well its performance may not be as efficient as desired.

The second class of micro-bridge can be termed "film-on-support" and provides a temperature dependent material (which may be resistive) as a film above a supporting bridge. Such a film on support micro-bridge is shown in section in FIG. 2b of the accompanying drawings. The bridge absorbs incident thermal radiation of the wavelengths of interest causing a temperature change within the bridge which effects the resistance of the resistive material. Generally the resistive material will be a metal which when positioned above the bridge reflects some of the incident radiation reducing the sensitivity of the micro-bolometer. Further, the provision of the metal on top of the bridge requires vias to be fabricated through the bridge necessitating further processing steps.

An example of a micro-bridge structure is shown in the Journal of Microelectromechanical systems Vol. 5 No. 4 Dec. 1996 in an article by Shie, Chen, et al. However, the micro-bolometer shown therein is fabricated by a process which is somewhat more complicated than may be desired. The bridge is formed over a V groove which is fabricated using an anisotropic wet etch.

A further micro bridge structure is also shown in U.S. Pat. No. 5,698,852 wherein a Titanium layer provides the resistor on the underside of a bridge formed from a layer of $SiO_2$. However, this document shows the resistive bolometer portion sandwiched between two $SiO_2$ layers. The micro-bolometer shown in this U.S. patent has a much more complex structure than that described herein. It will be appreciated that simplifying the structure and processing steps reduces the cost of the device and also helps to increase the yield.

According to a first aspect of the invention there is provided a method of fabricating a micro-bridge device onto a substrate including the steps:

a. providing a sacrificial material on a surface region of the substrate;—
b. patternwise etching the sacrificial material;
c. providing a sensing material on a surface region of the sacrificial material;
d. providing a support material on a surface region of the sensing material; and
e. removing the sacrificial material leaving the support material, with the sensing material on its lower surface, substantially free standing above the substrate.

This method is advantageous because it provides a micro-bridge structure by a method that has fewer processing steps than prior art methods. The skilled person will appreciate that the reduction of the number of processing steps is greatly advantageous because it will tend to increase the yield of the fabrication process and will also reduce the cost of devices fabricated by the method.

Advantageously, the support element is provided as a single layer of material and provides both physical support for the sensing material and acts as an absorber of incident radiation.

The sensing material may be a conductive material. Such a material is suitable for providing a micro-bridge structure in which a change of resistance is measured. Preferably the micro-bridge device is a micro-bolometer wherein the sensing material provides the resistor.

Alternatively, the sensing material may be a ferro-electric material. Such a material is suitable for providing a micro-bridge structure in which a change of charge is measured.

Preferably, the substrate has electronic circuitry provided therein. This is advantageous because it allows processing electronics to be provided for processing the signal from the micro-bridge and allows a single package to be provided containing both the micro-bridge and processing electronics. The provision of optimum processing electronics may not be possible in some prior art structures. For instance, in the paper by Shie, Chen, et al. the V-groove provided underneath the bridge structure is likely to prevent the provision of such electronics beneath the plan area of the bridge device—the region of the substrate where the electronics would be provided is etched away. Therefore, the structure provided by the method may provide an area beneath the micro-bridge device in which signal processing electronics may be located.

Most preferably the method is compatible with CMOS processing steps. This is advantageous because it allows standard fabrication processes to be used which will generally reduce the cost of devices fabricated according to the method.

Conveniently step b of the process includes providing vias through the sacrificial material allowing connections to the electronic circuitry in the substrate. Such a step is a convenient way of providing the single package with processing electronics and micro-bridge. The skilled person will appreciate that the vias may be defined using a conventional photoresist to pattern the sacrificial layer or by the use of a photo-imageable polymer as the sacrificial layer.

In one embodiment the sacrificial material is polyimide which may be spin deposited and cured. The sacrificial material may be applied to a thickness of about 3 $\mu$m. However, in alternative embodiments the sacrificial material may be applied to a thickness of between about 1.5 $\mu$m and about 6 $\mu$m, or may be between about 2 $\mu$m and about 4.5 $\mu$m. It will be appreciated that the thickness of the sacrificial material governs the height of the sensing material above the substrate in the final micro-bridge structure.

The method may include the steps of using an etch solvent to ensure that all resist layers are removed subsequent to deposition of the sacrificial material. The etch solvent may be EKC.

The sensing material may be titanium (Ti). Titanium is advantageous because of its change of characteristics with temperature and also due to its low noise levels. Further, titanium has a high resistivity which may allow the design to be optimised for CMOS circuitry more easily than other sensing materials. The skilled person will appreciate that for two equal portions of the material, the portion with the higher resistivity will have the higher resistance.

The sensing material may be deposited by sputter deposition, providing a convenient method which is CMOS compatible. The sensing material may be deposited to a thickness of about 0.2 $\mu$m.

However, the skilled person will appreciate that other thicknesses may be suitable. For instance the sensing material may be provided to a thickness in the range of about 0.05 $\mu$m to about 0.3 $\mu$m, or may be from about 0.1 $\mu$m to about 0.25 $\mu$m. If the micro-bridge device is a micro-bolometer the sensing material may form the resistor. It is desirable that the resistance of this resistor is relatively high because this makes the signal provided from the micro-bolometer easier to process. Providing the sensing material in this range provides suitable resistances. Thicknesses greater than this range may tend to reduce the resistance too much.

The thicknesses and resistances described herein are particularly suitable when the sensing material is Titanium. If the sensing material is another material other thicknesses may be applicable.

In alternative embodiments the sensing material may be amorphous silicon, vanadium oxide, platinum, nickel, aluminium, or an alloy of any one of the aforementioned metals each of which provides suitable properties.

The sensing material may have a sheet resistance of 3.3 $\Omega$/sq. Alternatively, the sensing material may have a sheet resistance of about 1.5 $\Omega$/sq to about 6 $\Omega$/sq, or may be of about 2.5 $\Omega$/sq to about 4.5 $\Omega$/sq.

Conveniently step C. of the method includes the further step of removing the sensing material from optical alignment targets (OAT) provided on the substrate for alignment of subsequent layers. Such a step is advantageous because it simplifies the remaining steps of the method and makes it easier to position the remaining layers. It will be clear to the skilled person that OAT's are necessary when a wafer stepper is used.

Step b of the method may also include the step of removing the sacrificial material from OATs provided on the substrate. Such a step is particularly advantageous should the sacrificial material be a material other than silicon dioxide.

Preferably the support material is deposited onto the surface region of the sensing material. This deposition process may be provided by Plasma Enhanced Chemical Vapour Deposition (PECVD), Low Pressure Chemical Vapour Deposition (LPCVD), or by sputtering.

The support material may be deposited to a depth of about 1 $\mu$m. This depth is convenient because it provides sufficient structural rigidity. However, the skilled person will appreciate that a range of other thicknesses may be suitable. For instance the support material may have a thickness of about 0.05 $\mu$m, 0.1 $\mu$m, 0.5 $\mu$m to perhaps about 2 $\mu$m, 3 $\mu$m, 4 $\mu$m, 51 $\mu$m.

Preferably, the method applies the support material to an accuracy of about ±10%. It will appreciated from the discussions above that the detector must be thermally isolated from its surroundings. Generally this is achieved by providing a bridge structure (of the support material) which is supported by a pair of legs. In such a structure the legs provide thermal contact between the bridge and the wafer or substrate. Having the legs too thick is disadvantageous because more heat is conducted from the wafer or substrate to the bridge which reduces the sensitivity of the micro bridge device. If the legs are too thin then there is not enough mechanical support for the bridge structure. There is therefore a compromise between providing rigid supports and providing thermal isolation.

The skilled person will appreciate that the micro bridge structure may be provided with a number of legs other than two. The micro bridge structure may be provided with 1,3,4,5,6,7 or more legs.

The method may comprise applying the support material to have a thickness of about ¼$\lambda$ where $\lambda$ is the wavelength of the incident radiation of interest within the support material. The skilled person will appreciate that the wavelength of the radiation will change according to the material in which it is travelling. Applying the support material to this thickness is advantageous because it causes destructive interference of radiation of the wavelength of interest being reflected from the bottom surface of the support material with radiation incident on the bridge. This destructive interference promotes energy absorption and increases the temperature rise of the support material due to the incident radiation of the wavelengths of interest.

The support material is conveniently patterned and etched to provide the necessary structures. Preferably, the resists used to pattern and etch the support material are removed by an etch solvent, which is conveniently EKC.

In one embodiment the support material is a silicon oxide which is advantageous because it is easy to provide using CMOS processing steps and readily absorbs radiation with a wavelength of about 8 $\mu$m to 14 $\mu$m which as discussed previously is the wavelength which is conveniently monitored by the micro-bridge device. It is advantageous that the support material absorbs the radiation to maximise the temperature change of the support material due to incident radiation of the desired wavelength. The skilled person will appreciate that for wavelengths other than 8 $\mu$m–14 $\mu$m other materials which absorbs the wavelengths of interest may be advantageous.

The method may include the further step of providing a reflective layer on a surface region of the substrate. Such a layer may further enhance the efficiency with which the micro-bridge structure absorbs incident radiation.

The reflective layer may be provided on a surface region of the substrate before the sacrificial layer providing a convenient way of positioning the reflective layer. It will be appreciated that such a method provides a micro-bridge structure with the reflective layer provided on a top region of the substrate with the micro-bridge structure substantially suspended above the reflective layer.

Conveniently the method provides the reflective layer from a metal which may be any one of the following: Aluminium, titanium, nichrome, platinum, nickel or an alloy of any of these metals.

The reflective layer may be provided by sputtering, evaporation or any other suitable technique as will be appreciated by the person skilled in the art.

Conveniently the sacrificial material is removed by ashing which may be performed in an oxygen plasma, providing an effective process for removing the sacrificial material without interfering with the layers covering the sacrificial material.

After step e. of the method a thermal anneal is preferably performed on the substrate. The thermal anneal is beneficial because it preserves the elevated value of the temperature coefficient of the resistance of the Ti, and may ensure that contacts within the circuits are formed correctly, etc. The thermal anneal may be provided by a rapid thermal annealing process or an industry standard furnace anneal.

The sensing material may be provided as at least one track. Preferably the method comprises providing the track such that incident radiation having a specific polarisation cannot pass therethrough. This may be achieved by arranging the track in a manner to block the passage of radiation having a polarisation. In particular, the track may be provided such that it has lengths running in directions transverse to one another. The track may be provided with substantial lengths running in directions parallel to one another, or may be transverse one another, or may be orthogonal one another. In other embodiments the method may comprise providing the track with curved portions. The curved portions may be circular, elliptical, etc.

A matching layer may be provided in a region above the support material, adapted to absorb incident radiation. The matching layer may be nickel chrome alloy and may be provided by evaporation, or may be sputtering.

A matching layer is advantageous because it may match the refractive index of the micro-bridge structure to that of free space. The skilled person will appreciate that when a wavefront is incident upon a boundary of materials each with different refractive indexes a degree of reflection will occur. Clearly, if incident radiation of the wavelength in question is reflected then the signal produced in response to the radiation will be reduced. It is therefore advantageous to minimise the amount of reflection occurring at the micro-bridge upper surface.

The matching layer may be deposited until it has the required resistance per square. The resistance may be about 377 $\Omega$/square. Alternatively, the resistance may be in the range of about 250 $\Omega$/sq to about 500 $\Omega$/sq., or may be in the range of about 320 $\Omega$/sq. to about 430 $\Omega$/sq.

The method may further comprise providing the micro-bridge structure within an encapsulated package. The encapsulated package may be filled with a gas having a low thermal conductivity (xenon is one example) or more preferably the encapsulated package may be evacuated.

According to a second aspect of the invention there is provided a micro-bridge structure having a substrate above which there is provided a support element of the micro-bridge structure, on the underside of the support element there is provided a sensing material, the sensing material being supported above the substrate by the support element but connected at connecting regions to tracks on the substrate.

An advantage of such a structure is that it is simpler to fabricate than prior art devices and may therefore provide higher yields and cheaper devices.

Preferably, the support element comprises a region of silicon oxide ($SiO_2$). This is a convenient material to provide being readily achievable in CMOS processes and strongly absorbs electromagnetic waves at the wavelengths of interest.

The support element may be substantially square in plan, providing an efficient shape from which to provide an array of micro-bridge structures.

In one embodiment the support element is substantially square in plan and has dimensions of substantially 50 $\mu$m for the sides of the support element. In alternative embodiments the support element may have sides in the range of about 25 $\mu$m to about 100 $\mu$m, or may be in the range 35 $\mu$m to about 75 $\mu$m.

The support element may be provided with leg portions adapted to suspend the support element above the substrate. Such leg portions are advantageous because of the thermal isolation they provide for the support element from the substrate. Thermal isolation is advantageous because the temperature changes which must be measured by the micro-bridge structure are of such a magnitude that they are likely to be lost if the thermal mass of the substrate is not excluded.

Conveniently, the sensing material is also provided on the underside of the leg portions. Such a structure is again convenient because it provides a structure wherein the sensing material on the support element can easily be connected to circuit elements on the substrate.

Preferably the sensing material is a conductive material. In which case the sensing material may form a resistor.

Alternatively, the sensing material may be a ferro-electric material. In which case the sensing element may form the dielectric of a capacitor.

Such structures are convenient because they provide means to measure temperature changes within the support element (i.e. a change in resistance of the resistor, or change of charge in the capacitor formed by the capacitor dielectric).

The resistor may be connected to a CMOS transistor provided in the substrate. This provides a convenient structure with which to process the information provided by the micro-bridge structure.

The transistor may be arranged as a switch providing a convenient structure with which to connect the resistor to processing electronics at the correct instant for its resistance to be measured.

The resistor may have a resistance of about 3 k$\Omega$. Alternatively, the resistor may have a resistance in the range of about 1.5 k$\Omega$ to about 6 k$\Omega$, or may be about 2 k$\Omega$ to about 4.5 k$\Omega$.

The sensing material may be a metal and in particular may be titanium which is convenient material to provide using CMOS compatible processes. Further, titanium exhibits a temperature dependent resistance which makes it particularly suitable for this application and has a relatively high resistivity. In alternative embodiments materials such as amorphous silicon, vanadium oxide, platinum, nickel, aluminium, an alloy of any one of the aforementioned metals may provide the sensing material.

Preferably the resistor is provided as a track on the support element. This is advantageous because it allows the length of the resistor to be maximised which increases the value of the resistance which can be provided. Having a higher resistance is in itself advantageous because it may be simpler for the detecting electronics to process readings from a resistor with a higher value.

Conveniently the track has a meandering structure, which is a convenient structure to attempt to maximise the length of the track. Preferably the meandering structure has major portions in transverse directions. The transverse directions may be substantially perpendicular to one another. Such transverse directions are advantageous because they may help prevent radiation having a particular polarisation from passing through the sensing element without being absorbed.

The skilled person will appreciate that in some embodiments the thickness of the support element is tailored to be substantially ¼$\lambda$ of the incident radiation within the material of the support element. Thus radiation of the wavelength of interest incident upon the support element may be reflected back toward a top surface of the support element by the lower surface and destructively interfere with the incident radiation of the wavelength of interest. The provision of the sensing material on the underside of the support element may help this reflection process and ensuring that radiation of a particular polarisation may not pass may further enhance this reflection process.

Conveniently, the support element may have a thickness of substantially one quarter of the wavelength of radiation of which is desired to measure. This is advantageous for the reasons outlined hereinbefore. Specifically, the support element may have a thickness of substantially 1 $\mu$m. In other embodiments the support element may have a thickness in the range of about 0.5 $\mu$m to 2 $\mu$m, or may be 0.75 $\mu$m to 1.5 $\mu$m.

A reflective layer may be provided to further enhance the percentage of radiation that is reflected back to the micro bridge structure from the substrate after passing through the micro bridge structure. The reflective layer may be provided on a top region of the substrate below the gap between the substrate and the micro-bridge structure.

Conveniently the reflective layer is fabricated from a metal which may be any one of the following: Aluminium, titanium, nichrome, platinum, nickel or an alloy of any of these metals.

The micro bridge structure may further comprise a matching layer which may be provided on an uppermost surface of the support element. Such a matching layer is advantageous because it is a further mechanism to ensure that the absorption of the incident radiation of the wavelength of interest is maximised. The matching layer may aid the structure to absorb radiation at the wavelengths of interest particularly strongly.

The skilled person will appreciate that when a wavefront passes between two media having some degree of reflection occurs. Therefore, the matching layer may match the refractive index of the micro-bridge to that of free space, which is advantageous because it may minimise the amount of reflection that occurs at an upper surface of the micro-bridge device.

According to a third aspect of the invention there is provided a transducer incorporating a micro-bridge structure according to a second aspect of the invention.

The transducer may be a pressure transducer. Because for a given bias current the micro-bridge structure temperature will depend on the heat conduction due to the surrounding gases it can measure the pressure of those gases. The transducer may be thought of as a Pirani gauge.

If the transducer is a Pirani gauge the sacrificial material may be deposited to a depth of about 0.1 $\mu$m by the method according to the first aspect of the invention. Possibly the sacrificial material may be deposited to about any one of the following depths: 0.05 $\mu$m, 0.075 $\mu$m, 0.125 $\mu$m or 0.15 $\mu$m.

The transducer may be a flow transducer. The temperature of the micro-bridge structure for a given bias current will depend on how quickly heat is carried away by gas or liquid flows and therefore may be used as a flow transducer.

Of course, the transducer may be used as an IR transducer in applications such as Fire detection, intruder alarms, IR imaging or automatic inspection.

Indeed, the transducer may be an IR emitter since the temperature of the micro-bridge will vary when a suitable current is passed through it. Such an emitter may be useful for generating the IR signatures of objects, perhaps for the purpose of simulation.

There now follows by way of example only a detailed description of the invention with reference to the accompanying drawings of which:

Figure 1:
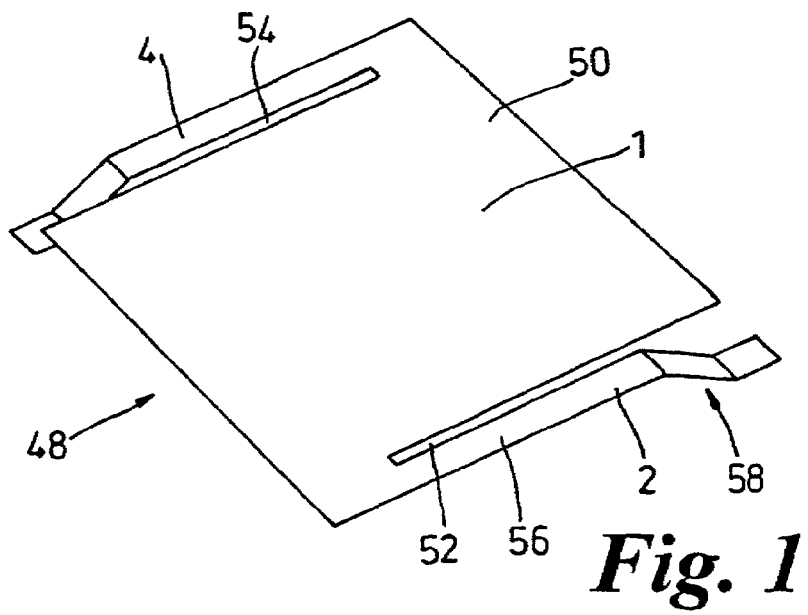
FIG. 1 shows a schematic view of a typical micro-bridge device.
Figure 4A:
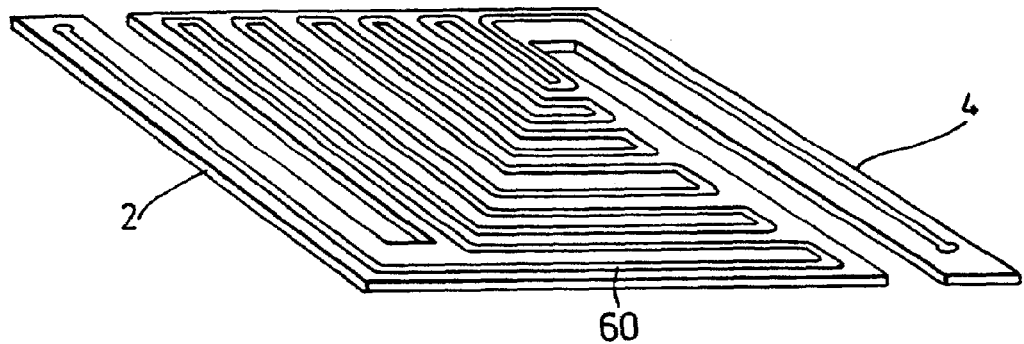
Figure 5:
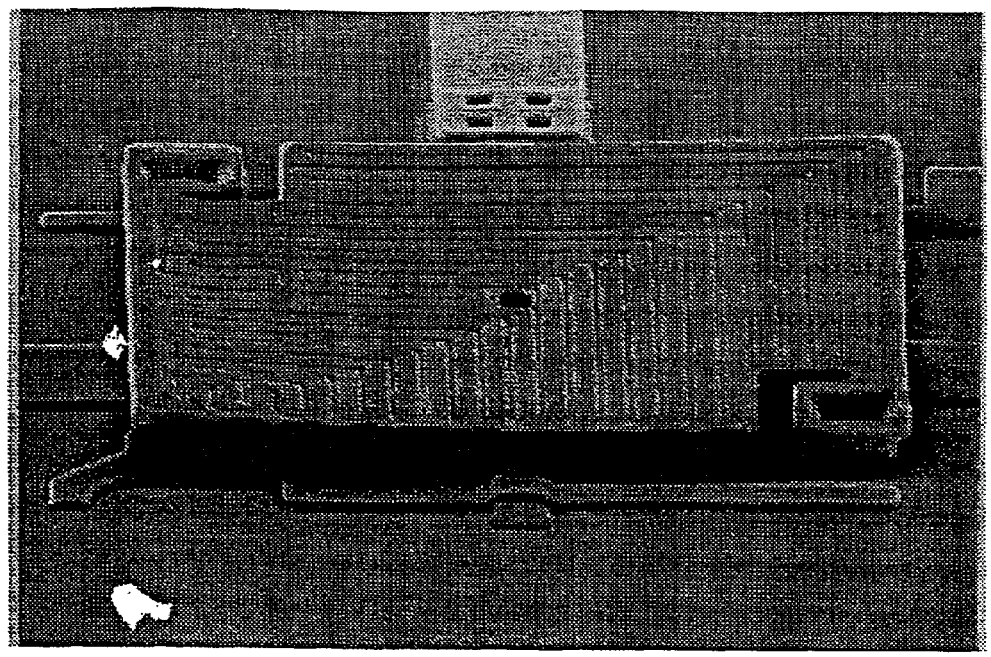
Figure 6:
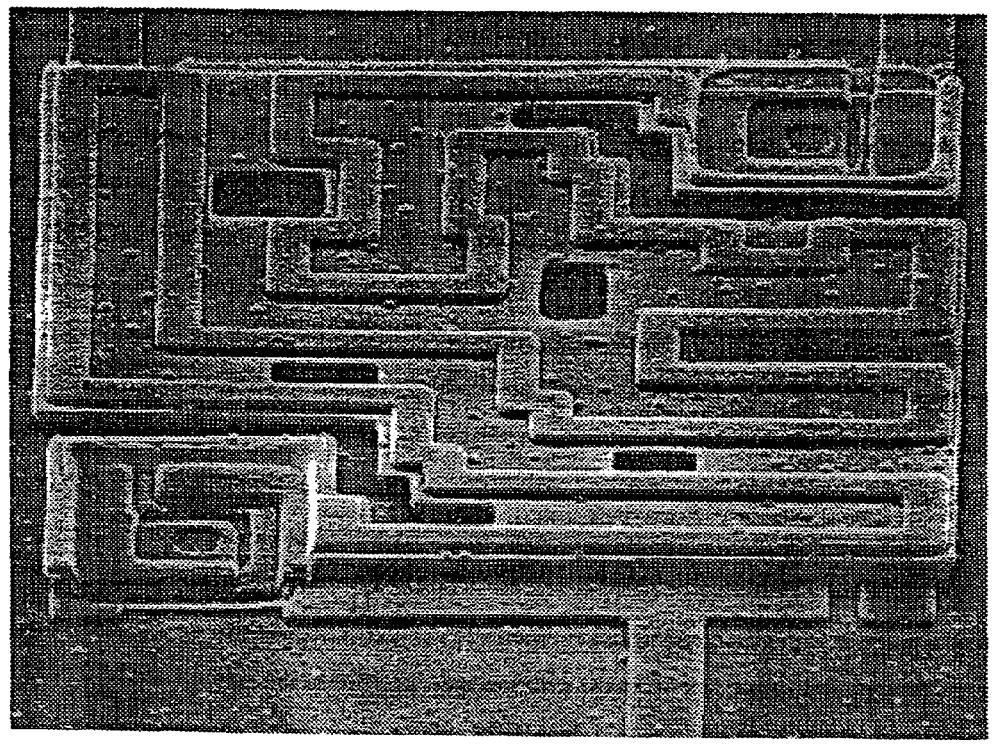

FIGS. 4a, b, and c show isometric views of the underside of the micro-bridge device of FIG. 1; and FIGS. 5 and 6 show scanning electron micrographs of micro-bridge structures according to the present invention.

FIG. 1 shows a typical micro-bridge device, in this case a micro-bolometer. A main body 1 is provided and adapted to absorb radiation of the wavelength of interest incident upon it. Legs 2, 4 are provided to support the main body 1 above a substrate (not shown) and provide thermal isolation from that substrate. The substrate may be constituted as a semi conductor wafer.

Figure 2A:
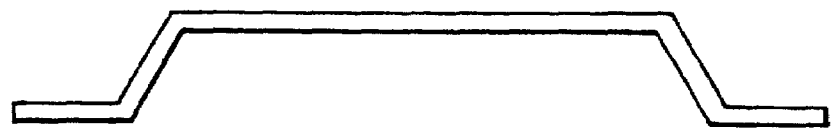
FIG. 2 shows cross sections through micro-bridge devices of three different types.

FIG. 2a shows a micro-bridge structure of the homogenous bridge type in which bridge is substantially of a uniform material. Some means of sensing is adapted to determine the temperature change of the bridge. The means of sensing may be by way of passing a current through the bridge and measuring the current change.

Figure 2B:
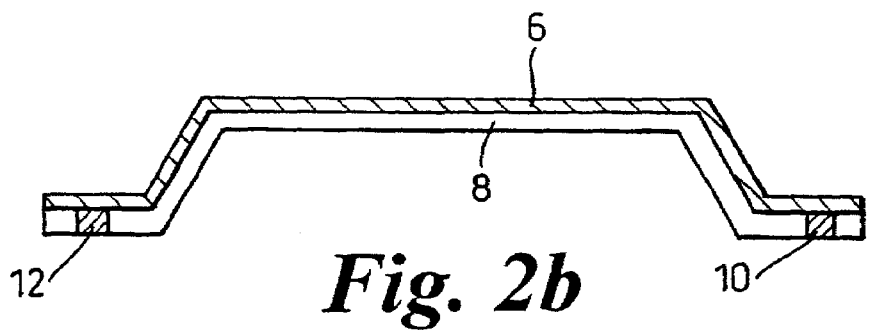

FIG. 2b shows a film-on-support type of micro-bridge structure wherein (in this case) a metallic film 6 is provided on top of a supporting bridge 8. The metallic film is shaped such that it acts as a resistor. Vias 10, 12 are provided through the bridge 8 to allow the resistor to be connected to processing electronics in a region underneath the bridge 8. Devices according to this design suffer from two disadvantages: Firstly, the metallic film reflects an amount of the incident radiation of the wavelength of interest thus reducing the efficiency of the design. Secondly, the fabrication of the vias 10, 12 introduces extra critical processing steps which not only makes the devices more expensive but also reduces the yield of the process.

Figure 2C:
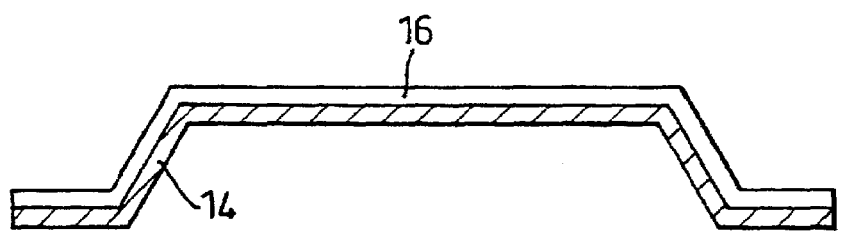

FIG. 2c shows the structure of a micro-bridge device, or in this case a micro-bolometer fabricated according to the invention wherein the metallic film 14 is provided on the under side of a bridge structure 16.

FIG. 3 outlines the process steps involved in fabricating the structure of FIG. 2c. The starting point of the process as shown in FIG. 3a is a fully processed CMOS wafer 20. The region 22 (which is only shown in FIG. 3a) is intended to represent CMOS circuitry provided in the wafer 20. In the example described in relation to FIG. 3 the initial steps of the method comprise providing a metal layer on the upper surface of the wafer. This metal layer connects the circuitry 22 to the micro-bridge structure. This metal layer may or may not be required depending on the number of metal layers available in the fabrication of the CMOS circuitry 22.

Figure 3A:
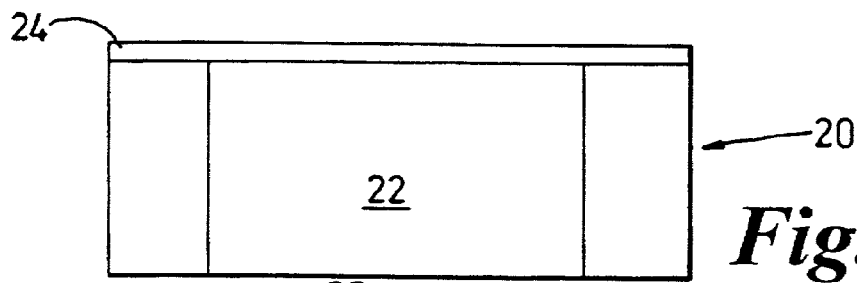
FIG. 3 shows cross sectional views of a fabrication process for a micro-bridge device according to the present invention.

At the start of the process described in relation to FIG. 3a the wafer 20 has a Boron Phospho-Silicate Glass (BPSG) passivation layer 24 provided on a top most surface.

Figure 3B:
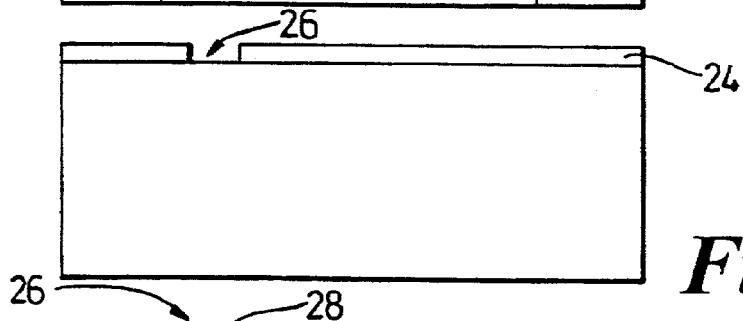
Figure 3C:
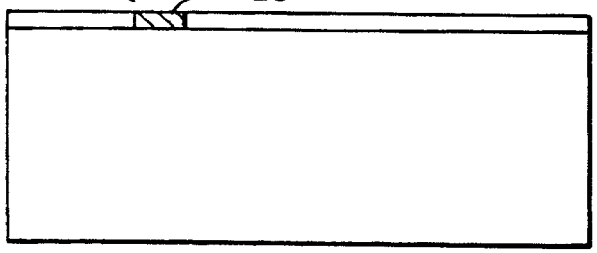

As shown in FIG. 3b the first step of the disclosed method is pattern and etch the BPSG passivation layer 24 to open vias 26 to the CMOS circuitry 22. Once the vias 26 have been opened a pre-metal clean is performed. This is achieved by the use of a 10:1 HF acid for 30 seconds.

Once the clean has been performed metal is deposited and patterned. Metal tracks 28 are formed in the vias 26. In one embodiment 5 μm of Al/1% Si was deposited having a resistivity of 60–70 m Ω/sq.

Figure 3D:
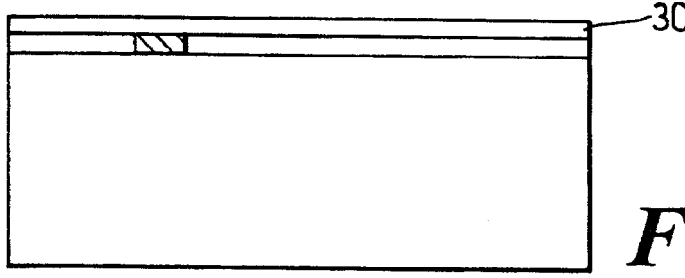
Figure 3E:
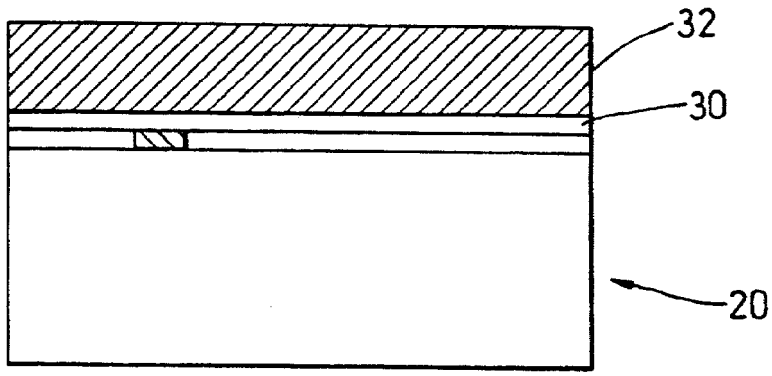

As shown in FIG. 3d once the metal tracks 28 have been provided a further passivation layer 30 is deposited on to the surface of the wafer 20.

In the embodiment shown the silicon nitride was deposited by Plasma Enhanced Chemical Vapour Deposition (PECVD) to a depth of 2 μm.

The skilled person will appreciate that should the CMOS circuitry have enough metal layers to provide connections to the micro-bridge structure which is to be fabricated that this point may be the start of the process.

Once the passivation layer 30 has been provided the sacrificial material 32 is provided onto the surface of the wafer 20. This sacrificial layer comprises a material that can be etched out from under the completed micro-bridge structure without the required etch damaging either the structure, the sensor material, or any underlying CMOS circuitry. Conveniently, this material may be a polyimide. A conventional polyimide may be used with a standard photoresist process to protect it during patterning, or a photo-imageable polyimide may be used which may be directly patterned after exposure to ultraviolet light through a defining mask.

In the embodiment described, a conventional polyimide was used with a photoresist. The sacrificial layer is spin deposited and cured to a depth of about 3 μm. After patterning it may be important to remove all traces of the resist layers, in the case of the embodiment described here this is achieved with an EKC etch. A small reduction in the thickness of the polyimide during this cleaning process can be tolerated.

Figure 3F:
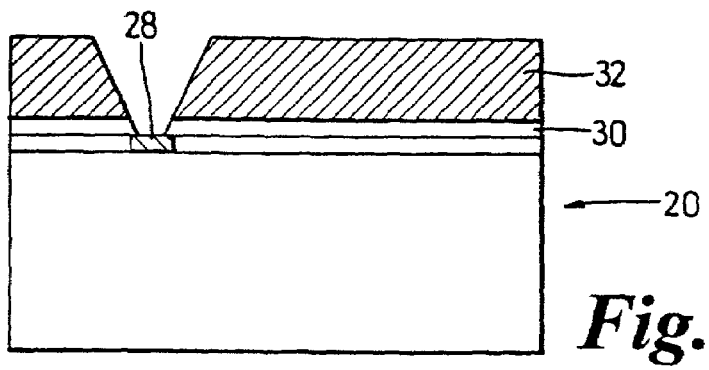

Once the sacrificial material 32 has been provided it is patterned and etched as shown in FIG. 3f. It should be noted that the passivation layer 30 is also etched in regions of the tracks 28 allowing contact to be made to the metal tracks 28.

Figure 3G:
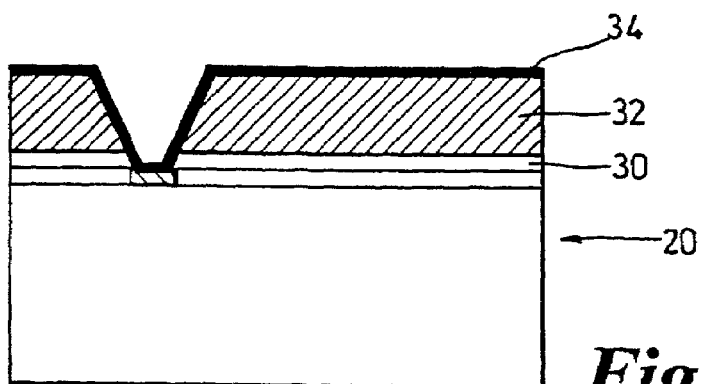

After the patterning and etching has been performed a substantially 0.2 μm thick layer of titanium 34 (a sensing material) is sputter deposited onto the surface of the wafer undergoing processing, as shown in FIG. 3g. The metal layer is plasma etched to provide the desired structure. At the same time as the sensing material is etched to provide the desired structure the sensing material is removed from the optical alignment targets (OATs) to aid coarse alignment of the subsequent layers.

Figure 3H:
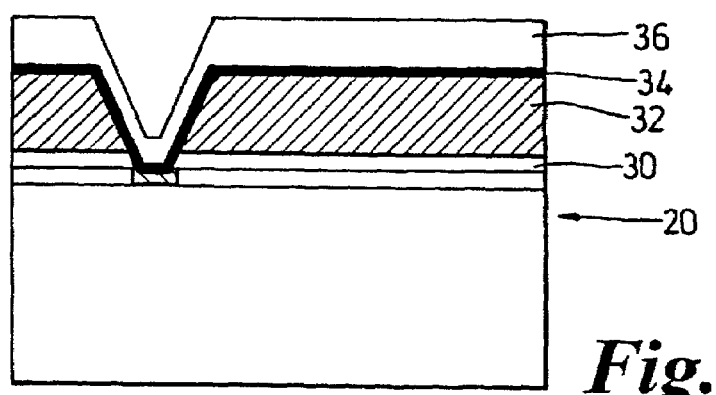
Figure 3I:
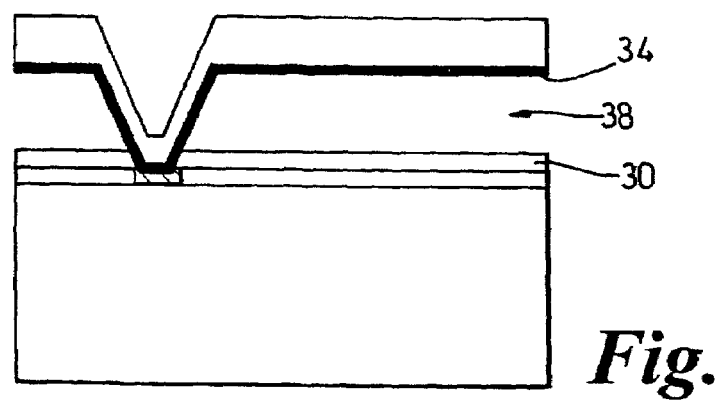

A substantially 1 μm thick layer of Silicon oxide 36 ($SiO_2$) (a support material providing the support element) is deposited onto the surface of the titanium 34, as shown in FIG. 3h. This oxide layer 36 is patterned and etched and it is ensured that the resists are removed using EKC.

In some embodiments of the process a matching layer (not shown) is deposited or grown on top of the oxide layer.

The next step is to ash the wafer undergoing processing to remove the sacrificial (polyimide) material. In the embodiment being described the ashing process lasts for about 12 minutes. This ashing process releases the support elements from the substrate and leaves a substantial void 38 between the titanium sensing material 34 and the passivation layer 30.

A final step of the process is to perform a rapid thermal anneal which lasts for 30 seconds and is performed at 400° C.

Figure 4B:
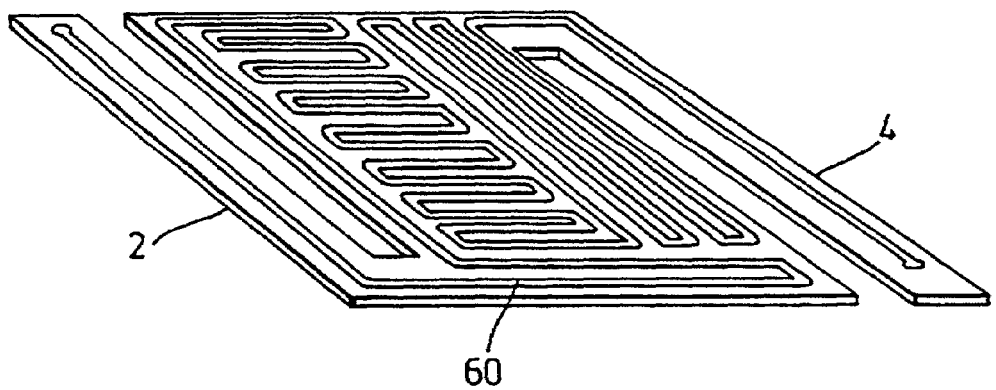

The skilled person will appreciate that FIGS. 1, 2c, and 4 show the structure of the micro-bridge device fabricated according to the process shown in FIG. 3.

Referring mainly to FIG. 1 the micro-bridge device 48 is substantially square in plan. The square portion comprises a support element 50 which is suspended above a substrate (not shown) by legs 2, 4. The legs 2, 4 are separated from the support element 50 by slits 52, 54 which ensure that the support element 50 has good thermal isolation from the substrate.

The structure of micro-bridge structure in FIG. 1 is somewhat simplified when considering the structure of the legs 2, 4. In FIG. 1 each leg 2, 4 comprises a planar portion 56 in the same plane as the support element 50 but separated from it by the slits 52, 54. In addition to the planar portion 56 there is provided an angular portion 58 which extends from the planar portion 56 at an angle toward the substrate over which the support element 50 is suspended. The planar portion of each leg 2, 4 is joined to the support element 50 by a connecting region. The angular portion is at a distal end from the connecting region.

The skilled person will appreciate that the specific structure of the legs 2, 4 fabricated by the disclosed method may differ slightly. The legs 2, 4 are formed by coating a depression etched into the sacrificial material with a sensing material and coating the sensing material with a support material.

On an under side of the support element 50 there is provided a metal track 60 (this is shown as the metallic film in FIG. 2c) which forms a resistor having temperature dependent properties. The track 60 runs from the substrate, up a first leg 2 of the micro-bridge device, across the connecting region (forming a connecting region of the resistor) joining the first leg 2 to the support element, meanders across the underside of the support element 50, across the other connecting region (forming another connecting region of the resistor) and down the other one of the legs 4.

As can be seen in FIGS. 4a and b in some embodiments the meanderings of the track 60 have major portions running in directions substantially perpendicular to one another. The meanderings ensure that the length of the track 60 is maximised to increase the value of the resistance provided by the track 60, which in this case is about 3 kΩ. The track is fabricated from Titanium, having a temperature coefficient of resistance of about 0.35%/K.

Figure 4C:
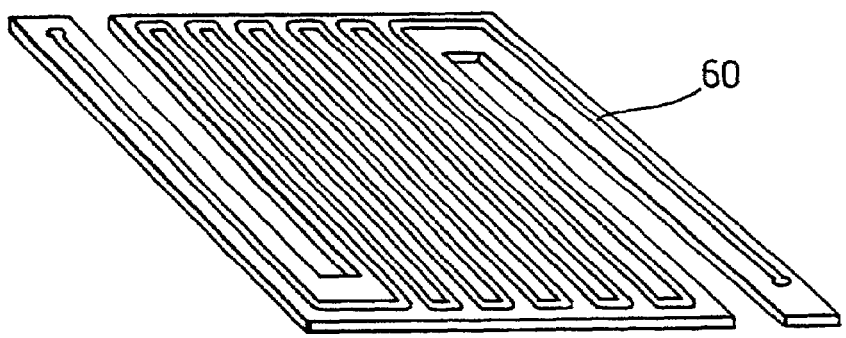

FIG. 4c shows an embodiment of the micro bridge structure with meanderings with major portions running in substantially only one direction.

The scanning electron micrographs shown in FIGS. 5 and 6 show the track having a meandering nature with major portions running in directions transverse to one another. It is believed that this meandering nature helps to prevent radiation of a particular polarisation passing through the micro-bridge.

The skilled person will appreciate that although the track is provided underneath the support material its path is visible, in FIGS. 5 and 6, on a top surface of the support material due to the nature of the processes which are used to fabricate the micro-bridge structure.

The thickness of the $SiO_2$ (the support material) from which the support element is fabricated is made to be equivalent to one quarter of the wavelength of the incident radiation of the wavelength of interest within the $SiO_2$. The skilled person will appreciate that the wavelength of the radiation will be different in free space and within the $SiO_2$. In this case the $SiO_2$ is made to be roughly 1 $\mu$m thick.

In use, an array of devices as shown in the Figures is provided and arranged to have radiation incident upon them. The support element 50 is tuned to absorb radiation in the wavelength range 8 $\mu$m–14 $\mu$m (but may alternatively be tuned to other wavelengths) and therefore experiences a temperature change when such radiation is incident. This temperature change causes the value of the resistance of the track 60 to change in a known manner and this change of temperature can be used by the circuitry to which the track 60 is connected to calculate the amount of radiation of the wavelength of interest that was incident upon the support element 50. Thus, the support element 50 is arranged to act both as a physical support and as an absorber of radiation. The micro-bridge device has in its simplest form two layers (a support material 36 and a sensing material 34), which together provide three functions: physical support, radiation adsorption and radiation detection.

The leg 2, 4 ensure that the support element 50 is mechanically supported above the substrate but their design ensures sufficient thermal isolation so that the thermal mass of the substrate does not affect the temperature change of the support element.

Radiation of the wavelength of interest incident upon the micro-bridge enters the bridge structure. Eventually this radiation hits the metallic film 14 forming the track 60 which reflects the radiation back toward the top surface of the micro-bridge. The pattern of the meandering track 60 is provided to ensure that radiation of all polarisations should be reflected and therefore absorbed, thereby increasing radiation absorption. If the meandering ran substantially in only a single direction it is possible that a higher proportion of radiation being polarised in the specific orientation may pass through the track than radiation of other polarisations (although a large proportion may still be reflected). Having meanderings in more than one-direction helps to reduce the amount of radiation that can pass through the track.

Because the $SiO_2$ is ¼ of the wavelength of the radiation of interest the total optical path length from the top surface to the metallic film down to the lower surface and then back to the top surface is ½ wavelength. Therefore, destructive interference occurs in a region of the top surface ensuring that a high degree of absorption of the radiation of interest occurs.

In some embodiments a matching layer may be provided on a top surface of the micro-bridge adapted to match the surface to free space i.e. 377 Ω/square. The skilled person will appreciate that when a wavefront passes between two mediums of differing refractive index a degree of reflection will occur. The matching layer helps to minimise this reflection and further increase the amount of radiation that is absorbed by the micro-bridge. It is important to ensure that the amount of radiation that is absorbed is maximised to ensure that the temperature change experienced by the support element 50 is as large as possible.

The skilled person will appreciate that although this application largely discusses absorption of radiation having a wavelength of 8 $\mu$m–14 $\mu$m the technology described may have wider applications. Detecting wavelengths of 8 $\mu$m–14 $\mu$m may be especially advantageous because it coincides with an atmospheric absorption window wherein there is little absorption by the atmosphere. The skilled person will further appreciate that there is a further absorption window between 3 $\mu$m–5 $\mu$m which may also be used. Further, it will be equally possible to fabricate devices which absorb radiation outside these wavelengths. In such devices the materials and structure of the bridge structure may simply need optimising for the wavelengths in question.

What is claimed is:

1. A bolometer comprising a support element forming a micro-bridge structure on a substrate, said support element comprising substantially a single layer of support material and carrying on its underside a resistive sensing material, wherein said support element is arranged to absorb incident radiation.

2. A bolometer according claim 1 wherein the thickness of said support element is tailored to be substantially ¼λ of the incident radiation within the material of said support element.

3. A bolometer according to claim 1 wherein said support material is $SiO_2$.

4. A bolometer according to claim 1 wherein said support element comprises a bridge portion and at least one leg portion, the or each said leg portion suspending said bridge portion above the substrate and wherein said resistive sensing material is provided on the underside of at least one of said leg portions.

5. A bolometer according to claim 1 wherein said resistive sensing material is provided as at least one track having a meandering structure.

6. A bolometer according to claim 5 wherein said meandering structure has portions in transverse directions.

7. A bolometer according to claim 6 wherein said transverse directions are substantially perpendicular to one another.

8. A bolometer according to claim 1 further comprising a matching layer on an uppermost surface of the support element.

9. A transducer incorporating a micro-bridge structure according to of claim 1.

10. A transducer according to claim 9 wherein the transducer is an IR transducer and/or emitter.

11. A method of fabricating a bolometer including a micro-bridge structure onto a substrate having the steps of:
  a. providing a sacrificial material on a surface region of the substrate;
  b. patternwise etching the sacrificial material;
  c. providing a sensing material on a surface region of the sacrificial material;
  d. providing a support material on a surface region of the sensing material; and
  e. removing the sacrificial material leaving support material with the sensing material on its lower surface, substantially free standing above the substrate.

12. A method according to claim 11 in which the sacrificial material is polyimide.

13. A method according to one of claims 11 or 12 wherein the method comprises applying said support material such that it has a thickness of about $\frac{1}{4}\lambda$ where $\lambda$ is the wavelength of the incident radiation of interest within said support material.

14. A method according to claim 11 which comprises providing the sensing material such that incident radiation having a specific polarisation cannot pass therethrough.

15. A method according to claim 11 wherein the sensing material is provided as at least one meandering track.

16. A method according to claim 15 in which the at least one track is provided such that it has lengths running in directions transverse to one another.

17. A method according to claim 11 wherein an encapsulated package is provided for the micro-bridge structure.

18. A method according to claim 17 comprising filling the encapsulated package with a gas having a low thermal conductivity, or evacuating the package.

19. A bolometer comprising a micro-bridge structure having a substrate above which there is provided a support element, arranged to absorb incident radiation, and on the underside of said support element there is provided a resistive sensing material arranged to change resistance in response to incident radiation, said sensing material being supported above said substrate by said support element but connected at connecting regions to tracks on said substrate and said support element running from a region adjacent said substrate and comprising substantially a single layer of material.

20. A resistive bolometer apparatus comprising a continuous layer of support material forming a micro-bridge over a substrate and at least one continuous track of sensing material on the underside of said support material.

21. A method of forming a micro-bridge bolometer device wherein a layer of resistive sensing material is provided prior to providing a layer of support material forming said micro-bridge.

* * * * *